US006838663B2

(12) United States Patent
Coon et al.

(10) Patent No.: US 6,838,663 B2

(45) Date of Patent: Jan. 4, 2005

(54) METHODS AND DEVICES FOR LASER DESORPTION CHEMICAL IONIZATION

(75) Inventors: Joshua J. Coon, Charlottesville, VA (US); Willard W. Harrison, Gainesville, FL (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 10/448,182

(22) Filed: May 29, 2003

(65) Prior Publication Data

US 2004/0007673 A1 Jan. 15, 2004

Related U.S. Application Data

(60) Provisional application No. 60/385,037, filed on May 31, 2002.

(51) Int. Cl.[7] .......................... B01D 59/44; H01J 49/00

(52) U.S. Cl. ...................................... 250/288; 250/282

(58) Field of Search ............................... 250/288, 287, 250/282, 281, 427, 423 R

(56) References Cited

U.S. PATENT DOCUMENTS

| | | | | | |
|---|---|---|---|---|---|
| 4,771,172 | A | * | 9/1988 | Weber-Grabau et al. | 250/282 |
| 4,988,879 | A | * | 1/1991 | Zare et al. | 250/423 P |
| 5,663,561 | A | | 9/1997 | Franzen et al. | |
| 5,955,731 | A | * | 9/1999 | Bergmann et al. | 250/288 |
| 5,965,884 | A | | 10/1999 | Laiko et al. | |
| 6,104,028 | A | * | 8/2000 | Hunter et al. | 250/288 |
| 6,281,493 | B1 | * | 8/2001 | Vestal et al. | 250/287 |
| 6,288,390 | B1 | * | 9/2001 | Siuzdak et al. | 250/288 |
| 2003/0111600 | A1 | | 6/2003 | Thompson et al. | |

FOREIGN PATENT DOCUMENTS

JP 11064283 3/1999

OTHER PUBLICATIONS

Bruins, A.P. "Mass Spectrometry with Ion Sources Operating at Atmospheric Pressure" *Mass Spectrometry Reviews*, 1991, pp. 53–77, vol. 10.

Dzidic, I. et al. "Atmospheric Pressure Ionization (API) Mass Spectrometry; Formation of Phenoxide Ions from Chlorinated Aromatic Compounds" *Analytical Chemistry*, Jul. 1975, pp. 1308–1312, vol. 47, No. 8.

Escandon, N.A. et al. "Characterization of the Serotonin$_{1A}$ Receptor Antagonist Activity of WAY–100135 and Spiperone" *The Journal of Pharmacology and Experimental Therapeutics*, 1994, pp. 441–447, vol. 268, No. 1.

Harrison, A.G., *Chemical Ionization Mass Spectrometry 2$^{nd}$ Edition*, 1992, CRC Press, Inc., U.S.A.

(List continued on next page.)

*Primary Examiner*—John R. Lee
*Assistant Examiner*—Johnnie L Smith, II
(74) *Attorney, Agent, or Firm*—Saliwanchik, Lloyd & Saliwanchik

(57) ABSTRACT

The subject invention pertains to a methods and devices for ionizing a sample material. The subject invention also relates to an ionization source and to a method of sampling gas-phase ions from a sample. An ionization source in accordance with the subject invention can be used in conjunction with mass spectrometry or other sampling techniques. The subject invention can utilize a means for desorbing gas-phase ions and neutral molecules from a sample and a means to generate reagent ions where the reagent ions ionize the desorbed neutral molecules so as to increase the population of gas-phase ions. The subject invention can incorporate laser radiation for desorbing gas-phase ions and neutral molecules from a sample. In a specific embodiment, the subject invention provides an ionization source that uses a pulsed laser for desorption, so as to produce a population of desorbed neutral molecules from a sample, as well as a number of gas-phase sample ions. In a further specific embodiment, the pulsed laser radiation can be adjusted such that neutral molecules are desorbed without the production of gas-phase sample ions by the laser radiation.

75 Claims, 8 Drawing Sheets

OTHER PUBLICATIONS

Sunner, J. et al. "Sensitivity Enhancements Obtained at High Temperatures in Atmospheric Pressure Ionization Mass Spectrometry" *Analytical Chemistry,* 1988, pp. 1308–1313, vol. 60, No. 13.

Sunner, J. et al. "Factors Determining Relative Sensitivity of Analytes in Positive Mode Atmospheric Pressure Ionization Mass Spectrometry" *Analytical Chemistry,* 1988, pp. 1300–1307, vol. 60, No. 13.

Coon, J.J. et al., "Atmospheric Pressure Laser Desorption/Chemical Ionization Mass Spectrometry: A New Ionization Method Based on Existing Therms" *Rapid Commnuications in Mass Spectrometry,* 2002, pp. 681–685, vol. 16.

Coon, J.J. et al. poster materials "The Development of a Novel Atmospheric Pressure–Laser Desorption/Chemical Ionization (AP–LD/CI) Interface for Imaging Mass Spectrometry" *17th Asilomar Conference on Mass Spectrometry,* 2001.

Laiko, V.V. et al. "Atmospheric Pressure Matrix–Assisted Laser Desorption/Ionization Mass Spectrometry" *Anal. Chem.,* 2000, pp. 652–657, vol. 72.

* cited by examiner

C

METHODS AND DEVICES FOR LASER DESORPTION CHEMICAL IONIZATION

CROSS-REFERENCE TO A RELATED APPLICATION

This application claims the benefit of provisional patent application Ser. No. 60/385,037, filed May 31, 2002, which is hereby incorporated by reference in its entirety.

The subject invention was made with government support under a research project supported by NIH Grant No. ES07375.

BACKGROUND OF THE INVENTION

Mass spectrometry continues to expand in application and importance. Much of this activity arises from new ionization sources that, for example, expand existing capabilities and/or allow new analytical techniques.

Mass spectrometers can be separated into two categories: those that possess atmospheric pressure sampling inlets, and those that possess vacuum sampling interfaces. Instruments operating at atmospheric pressure are typically equipped with an electrospray ionization source, which generates ions from solutions at atmospheric pressure and is commonly coupled to liquid chromatography. Instruments possessing vacuum sampling interfaces are often equipped with matrix-assisted laser desorption/ionization (MALDI) sources. Since these ionization techniques are complementary in many ways, laboratories are normally outfitted with at least one of each. Because mass spectrometers are typically dedicated to one technique or the other, and since these instruments are expensive both to purchase and maintain, operating costs of a facility capable of both techniques can be high.

Matrix assisted laser desorption ionization (MALDI) can provide an ion source for the analysis of biologically important molecules. By use of a pulsed laser for one-step desorption and ionization, the technique shows application under both reduced pressure and atmospheric pressure conditions. But problems can remain, particularly in the lower Dalton range where high background can persist.

Corona discharges are widely used as electron emitters for primary ion formation in atmospheric pressure chemical ionization (APCI) sources (Dzidic I., Carroll, R. N., Stillwell, R. N., Horning, E. C. (1991) *Anal Chem.* 48:1763), providing efficient ionization of gas phase neutral molecules (Bruins, A. P. (1991) *Mass Spec. Rev.* 10: 53). Typically, these neutral molecules are delivered into the corona discharge region as gas or liquid chromatograph effluents (Harrison, A. G. (1992) *Chemical Ionization Mass Spectrometry,* CRC Press:Boca Raton, Fla., pp. 53).

BRIEF SUMMARY OF THE INVENTION

The subject invention provides new and advantageous methods and devices for ionizing and analyzing sample materials. In specific embodiments, the subject invention provides ionization sources, and methods for creating and sampling gas-phase ions from a sample. As described herein, the new ionization process of the subject invention can be used in conjunction with mass spectrometry or other analytical techniques.

In one embodiment, the subject invention utilizes a means for desorbing gas-phase ions and neutral molecules from a sample, and a means to generate reagent ions where the reagent ions ionize the desorbed neutral molecules so as to increase the population of gas-phase ions.

In one exemplified embodiment, the subject invention utilizes laser radiation for desorbing gas-phase ions and neutral molecules from a sample. In a specific embodiment, the subject invention utilizes an ionization source that uses a pulsed laser for desorption, so as to produce a population of desorbed neutral molecules from a sample, as well as a number of gas-phase sample ions.

One specific embodiment of the subject invention incorporates an atmospheric pressure-laser desorption/chemical ionization (AP-LD/CI) source that utilizes a laser pulse to desorb intact neutral molecules, followed by chemical ionization via reagent ions produced by a corona discharge. This source can employ a heated capillary atmospheric pressure inlet coupled to a quadrupole ion trap mass spectrometer and can allow sampling under normal ambient air conditions. Advantageously, this technique can provide~150-fold increase in analyte ions compared to the ion population generated by atmospheric pressure infrared matrix-assisted laser desorption/ionization (AP-IR-MALDI).

DETAILED DESCRIPTION OF THE INVENTION

Figure 1:
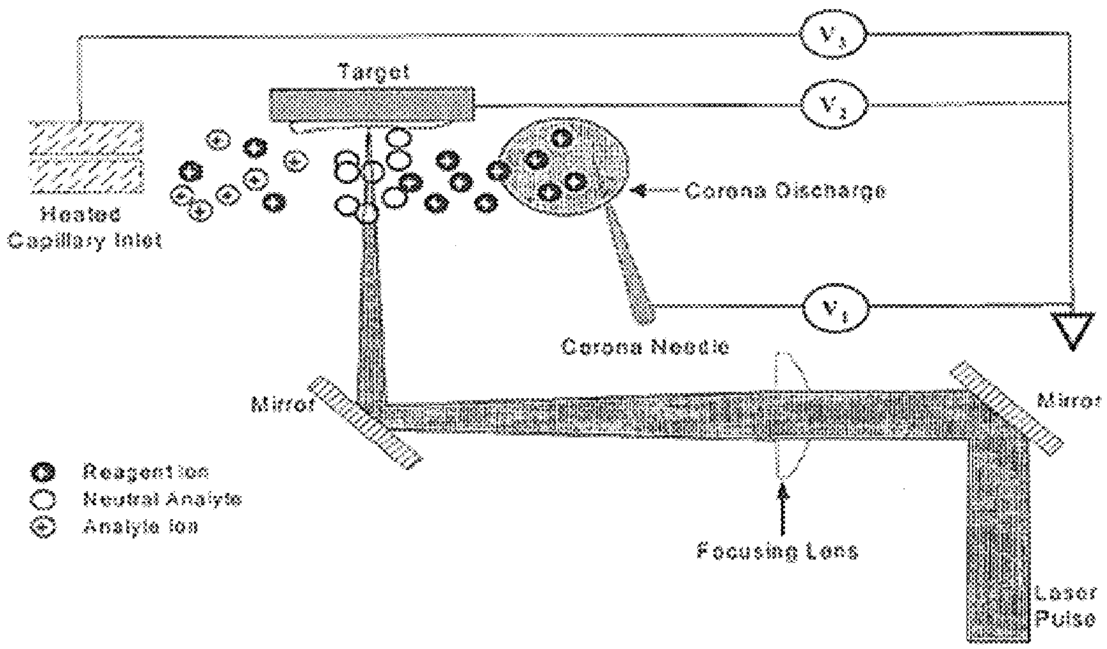
FIG. 1 shows an embodiment of an atmospheric pressure laser desorbtion/chemical ionization (AP-LD/CI) source in accordance with the subject invention.

The subject invention pertains to methods and devices for ionizing a sample material. The subject invention also relates to an ionization source and to a method of sampling gas-phase ions from a sample. An ionization source in accordance with the subject invention can be used in conjunction with mass spectrometry or other sampling techniques.

In one embodiment, the subject invention utilizes a means for desorbing gas-phase ions and neutral molecules from a sample, and a means to generate reagent ions where the reagent ions ionize the desorbed neutral molecules so as to increase the population of gas-phase ions.

The subject invention can incorporate laser radiation for desorbing gas-phase ions and neutral molecules from a sample. In a specific embodiment, the subject invention provides an ionization source that uses a pulsed laser for desorption, so as to produce a population of desorbed neutral molecules from a sample, as well as a number of gas-phase sample ions. In a further specific embodiment, the pulsed laser radiation can be adjusted such that neutral molecules are desorbed without the production of gas-phase sample ions by the laser radiation. Accordingly, it is understood that, for ease of description, as the subject invention is described throughout the subject application as utilizing a means for desorbing gas-phase sample ions and neutral molecules from the sample, such as a means for incidenting laser radiation on the sample, each embodiment can also utilize a means for desorbing neutral molecules without the desorption of substantial numbers of if any, gas-phase ions from the sample.

As described more fully herein, the apparatuses and methods of the subject invention can result in high sensitivity and low backgrounds. For example, in specific embodiments, spectral background at $m/z<1000$ can be essentially eliminated, which can be beneficial for sampling compounds of low mass.

A further advantage of certain embodiments of the subject invention is that they facilitate sampling with little or no sample preparation. Direct solids sampling from gels, plates, and tissues can be accomplished with specific embodiments of the subject invention.

Sample Desorbtion and Ionization

The ionization source used in the practice of the subject invention can operate at atmospheric pressure and, in a specific embodiment, operates at ambient conditions. The sample ions produced by the laser desorption and chemical ionization can then be sampled using, for example, a mass spectrometer. In a specific embodiment, these sample ions are sampled using a mass spectrometer equipped with an atmospheric pressure inlet. In alternative embodiments, the subject ionization source operates at pressures between vacuum and several atmospheres.

In one embodiment, the subject invention can be used to generate sample ions at atmospheric pressure for ion mobility experiments or ion mobility performed in tandem with mass spectrometry. By allowing sampling at atmospheric pressure, analyses can be performed conveniently and rapidly, and without the use of costly and time-consuming vacuum interlocks for insertion of samples into vacuum chambers.

An embodiment of the subject source that operates at atmospheric pressure, allows more gentle ionization and easier sample handling. As desorption/ionization can be performed under normal atmospheric pressure conditions in accordance with the subject invention, sample distortion can be reduced as compared with techniques requiring a vacuum, and laser spot size can be reduced (increasing image resolution) by using near-field optical probes which are quite difficult to use in vacuum. The subject invention also facilitates the imaging of living organisms via mass spectrometry.

An embodiment of the subject invention which operates at atmospheric pressure can be used as a replaceable and independent source on a instrument having an atmospheric pressure inlet, such as a mass spectrometer having an atmospheric pressure inlet. Accordingly, a mass spectrometer possessing an atmospheric pressure inlet can be equipped with an electrospray (ESI) ionization source and an LD/CI ionization source in accordance with the subject invention, so as to allow switching from one source to the other. Such switching can be performed quickly and easily, for example in less than about five minutes. Incorporating the ability to switch between two sources enables a mass spectrometry facility to be "full-service" through the purchase of a single mass spectrometer.

Coupling of the subject ionization source with a mass spectrometer can provide the combination of a pulsed source and a pulsed mass spectrometer. By determining the optimum time for mass spectrometer data acquisition after each laser pulse, discrimination effects can be selected to enhance the mass spectra. The spectral background can have a different temporal profile than the analyte species, permitting selective enhancement, and the composition of the analyte profile itself can show time dependent effects. By appropriate timing of the ion acquisition pulse following the laser pulse, improvement of signal-to-background and detection limits can be achieved.

The radiation used for desorption can have any of a wide range of wavelengths. The radiation may be, for example, IR, visible, or ultraviolet (UV). For example wavelengths from about 100 nm to 25 $\mu$m can be used. Thus, in a specific embodiment, a near IR laser pulse having, for example, wavelengths in the 0.8–25 $\mu$m range can be utilized to desorb sample ions and sample molecules from a sample. In further specific embodiments, a laser having a wavelength near 3 $\mu$m can be used to correlate with N—H and O—H stretching modes; a laser having a wavelength near 5.5–6.5 $\mu$m can be used to correlate with C═O and C—N stretching modes; and/or a laser having a wavelength near 10 $\mu$m can be used to correlate with O—H and C—H stretching modes. Furthermore, wavelengths in the ultraviolet (UV) or visible (VIS) ranging from about 100 to about 1000 nm can be utilized.

Once desorbed, the neutral molecules can then be ionized to produce additional gas-phase ions. The ionization source used according to the subject invention can utilize a means for generating reagent ions from the surrounding environment that interact with the desorbed gas-phase sample ions and neutral sample molecules. The means for generating reagent ions from the surrounding environment that interact with the desorbed gas-phase sample ions and neutral sample molecules can be, for example, a discharge or a Beta-emitter. Examples of discharges that can be used include, but are not limited to, a glow discharge and a corona discharge.

Advantageously, the combination of the laser pulse desorption followed by chemical ionization at atmospheric pressure produces an enhanced population of sample ions. Laser desorption of neutral molecules near a source of reagent ions, such as a discharge, can decouple the desorption and ionization processes, thus allowing individual optimization of these two steps so as to increase efficiency and selectivity. In particular, by incorporating two steps in the ionization process, conditions can be optimized for each step, and important temporal advantages are gained.

In a specific embodiment of the subject invention utilizing a corona discharge, the corona discharge operates in a continuous mode. Alternative embodiments can utilize a pulsed corona discharge. A pulsed discharge can be adjusted to the duty cycle of the laser pulse, using an appropriate delay after the laser desorption of neutral molecules to fire the ionization pulse. Operating at a shorter duty cycle, the corona discharge can provide more pulse power and thus more ionization of the neutral molecules.

In a specific embodiment, the desorption/ionization is performed in the positive mode, for example with respect to species with moderate to high gas-phase proton affinities, and in the negative mode, for example with respect to species with low gas-phase proton affinities or species with moderate to high gas-phase electron affinities such as halogenated species.

Figure 2:
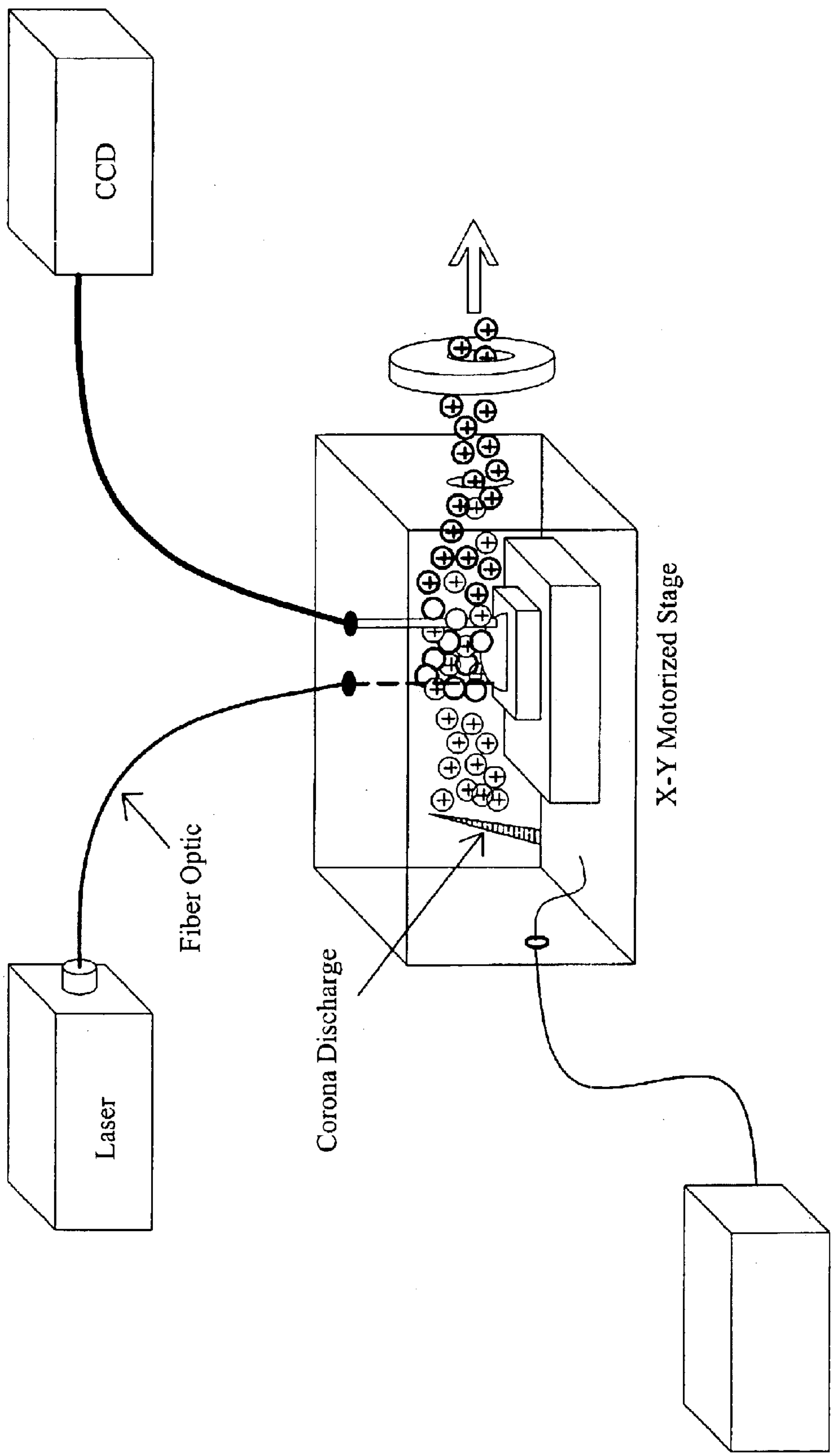
FIG. 2 shows an embodiment of an AP-LD/CI source.

In the embodiment of the subject invention shown in FIG. 1, each component (e.g., target, needle, mirror) may be adjusted individually relative to each other and the mass spectrometer inlet orifice. Several parameters can be adjusted to optimize the sampling, including one or more of the following: corona needle positioning, corona needle voltage, target positioning, target voltage, laser irradiance, laser pulse timing, purge gas composition, and optimization of ion transmission optics. Additional electrodes, for example, one or more ion lenses, can be used to assist transport of generated ions into a sampling inlet of a mass spectrometer. Specific gas flows can also be utilized to provide, for example, improved ion transport and/or background ion/molecule discrimination In a specific embodiment, the subject ionization source operates in a sealed environment. FIG. 2 shows a specific embodiment of the subject invention where the source is enclosed. Enclosing the source can increase safety and allow for purging the atmospheric pressure sampling region with specialty gases. Such a sealed environment can be purged with specialty gases, such as, but not limited to, N, Ar, He, $CH_4$, CO, $CO_2$, $H_2O$, and mixtures thereof. The compact source housing can contain an electrical feedthrough for the corona discharge voltage and an optical fiber optic inlet for the laser. A motorized XY or motorized XYZ translation stage can allow for computer controlled sample movement, the loading of multiple samples, acquisition of analyte images, and micro-manipulation of the sample with respect to the laser beam can be incorporated. Such a motorized stage can be computer controlled and synched to, for example, mass spectrometric data acquisition, thereby allowing for the convenient collection of mass spectrometric images.

In a specific embodiment, a charged-coupled device (CCD) imaging system, with optional magnification, can be built into the source to view the desorption/ionization process in real time. The source can be easily mounted, engaged, and dismounted, such that switching between this source and other ion sources can be rapid and convenient.

Sample Materials

The devices and methods of the subject invention can be used to desorb and ionize a variety of sample materials. The sample material can be, for example, liquid or solid and can, optionally, be affixed to a target. In a specific embodiment of the subject invention, test analytes are dissolved in glycerol (and other matrices) and placed on a target for analysis.

In one embodiment, the use of a discharge, such as a corona discharge, to generate reagent ions from the surrounding environment is used to enhance the ionization efficiency after a laser desorption event. This enhanced efficiency allows the use of a matrix, or support structure, for positioning the analyte with respect to the target, which does not have to assist with the desorption process. Many different types of matrix material can be used as a support structure for the analyte, or samples to be ionized; the subject technique does not rely on a specially formulated matrix to perform desorption and/or ionization. In a specific embodiment, the supporting structure for the analyte can be passive during the desorption process.

Matrices that can be utilized with the subject invention include, but are not limited to, polyacrylamide gels, agarose gels, biological tissues, paper, thin-layer chromatography plates, fabrics, polymers, plastics, geological material such as soil, and biological solutions such as blood plasma, whole blood, urine, and extracellular fluid.

Liquid matrices that can be utilized to provide structural support for analytes to be desorbed/ionized include, but are not limited to, glycerol, water, and m-Nitrobenzyl alcohol (NBA). The subject invention facilitates the direct sampling of whole blood or plasma for pharmaceutical, biological, or toxicant compounds without need for prior sample cleanup or extraction. In addition, with respect to biological matrices, such as blood plasma, certain embodiments of the subject invention allow for direct desorbing and analysis of trace components. Solid matrices can also be utilized in conjunction with the subject invention. Tissue, soil, or other solids containing an analyte can be directly compatible for analysis in accordance with the subject invention.

Liquid matrices, in contrast with solid matrices, provide continual surface refreshment, which can generate a stable signal over long periods of time without any XY sample manipulation. For example, stable analyte ion signals have been monitored for over an hour from a 4 microliter glycerol matrix.

The subject invention can be utilized in conjunction with a variety of analytical techniques, such as gel electrophoresis and thin layer chromatography. The entire slab of gel or thin layer plate can be affixed to the device and sampled without the necessity of any prior cleanup or extraction steps. Similarly, biological tissues can be directly probed for target compounds of interest using the subject method and apparatus. The subject method and apparatus facilitate direct analysis of biological solutions, for example blood plasma, at atmospheric pressure without the necessity of sample cleanup or chemical additives. In a specific embodiment, aqueous solutions, for example biological solutions, can be analyzed in accordance with the subject invention.

Direct imaging of target compounds in solid samples, for example tissue, electrophoresed gels, and chromatographed thin plates for biomolecules, pharmaceuticals, or environmental contaminants can be achieved by, for example, computer-controlled movement of the target stage and/or laser beam. The detection results can then be correlated with the time dependent position of the laser beam with respect to the sample. These images can provide information regarding the location of the various compounds contained in the sample, and can also provide molecular weight information to assist in identification.

Figure 3A:
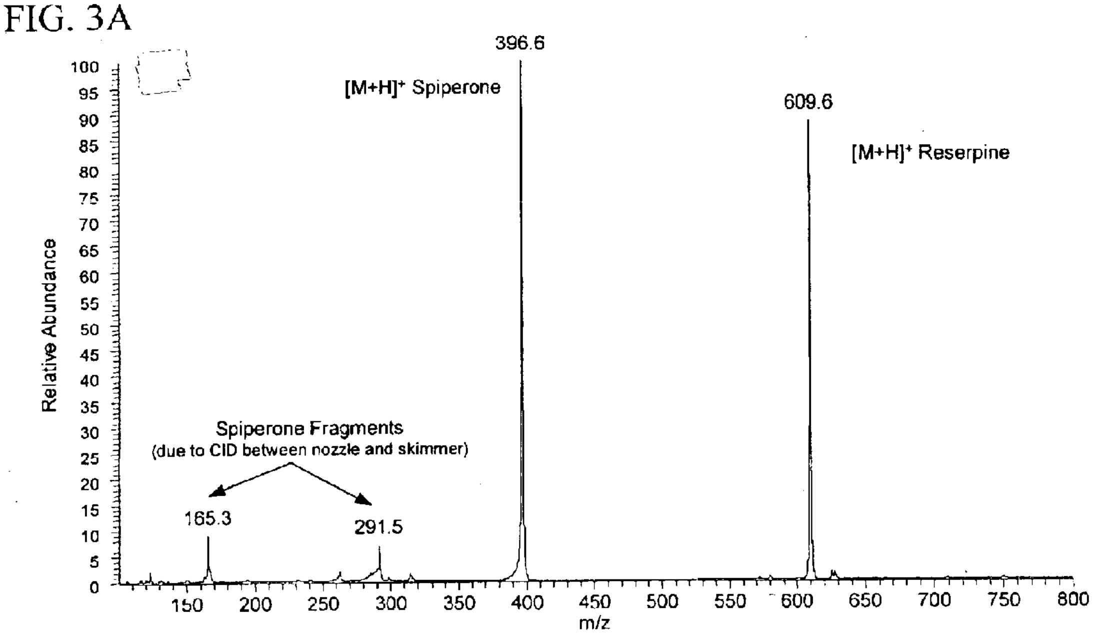
FIG. 3A shows a mass spectrum from experiments involving the desorption of spiperone and reserpine.
Figure 3B:
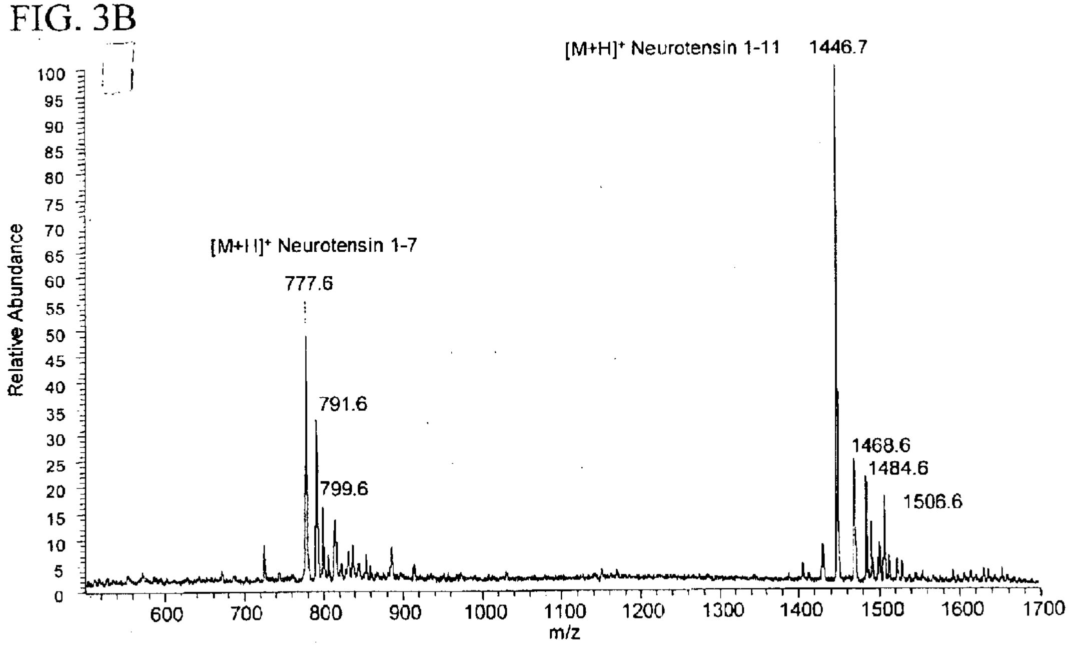
FIG. 3B shows a mass spectrum from experiments involving the desorption of neurotensin 1-7 and neurotensin 1-11.

The results of experiments, as shown in FIG. 3, indicate the source is well-suited for the desorption/ionization of pharmaceutical compounds like spiperone and reserpine, as well as for biologically important peptides such as neurotensin 1-7 and neurotensin 1-11 directly from a glycerol matrix. Other compound classes that can be desorbed/ionized include pesticides, other proteins, other pharmaceutical compounds, biomolecules (e.g., oligonucleotides), environmental toxicants, small biologicals, tryptic peptides, and other peptides.

In one embodiment, the subject invention facilitates the analysis of tryptic peptides directly from a polyacrylamide gel. Much of the work to date on imaging proteins and peptides from gels involves coating the gel with matrix and inserting the sample into a vacuum for MALDI-MS analysis. This approach requires substantial preparation and effort, both to apply the matrix and to transport the gel into a vacuum. With the subject ionization source, gels can be placed on the target with little or no preparation and directly imaged. These images can contain information regarding the position of proteins on the gel (vs. staining and photographing, as is commonly done), and can also provide specific mass information, allowing either immediate identification or permitting the analyst to run the spectral information through a data base for identification.

The subject invention also facilitates the imaging of smaller organic compounds directly from thin layer chromatography (TLC) plates. Individual spots on the plates can be directly imaged to reveal the composition of the separated species. Because only the $[M+H]^+$ is likely to be generated for most compounds, collision-induced dissociation (CID) can be performed to give structure specific information.

The subject invention can also allow the analysis of tissue thin slices for specific target compounds. For example, analysis as to whether a drug can penetrate the site-of-action (e.g., a cancer drug penetrating a tumor) can be made, in order to obtain information about the drug's potential efficacy. In fact, mass spectrometric imaging of smaller organic species (m/z <1000) has been difficult because the MALDI matrix typically used generates a large background below 1000 daltons. The subject ionization source can desorb analytes directly from the tissue without an added matrix.

Imaging of soil samples for non-polar toxicants presents numerous problems for traditional mass spectrometry imaging. Most soil imaging is currently done via secondary-ion mass spectrometry (SIMS), which requires the sample to be inserted into a high vacuum, under which conditions small non-polar analytes likely desorb from the surface once inserted into the vacuum and are therefore not detected. The ionization source of the subject invention, which can operate at atmospheric pressure, alleviates this problem.

Representative analytes and matrices from each compound class can be selected for sensitivity assessment. Calibration plots can be constructed for a range of concentrations. These data can be used to estimate the LOD and to evaluate the potential for quantification. In a specific embodiment of the subject invention, a liquid matrix such as glycerol can eliminate much of the shot-to-shot variation rendering a much more stable signal.

The following examples illustrate procedures for practicing the invention. These examples should not be construed as limiting. All percentages are by weight and all solvent mixture proportions are by volume unless otherwise noted.

EXAMPLE 1

Analysis of Spiperone and Reserpine

A specific embodiment of an AP-LD/CI source interface, as shown in FIG. 1, has been designed around a stainless steel, heated capillary, atmospheric pressure inlet (ThermoFinnigan, San Jose, Calif., USA). The corona needle was positioned approximately 1.5 cm (on-axis) from the heated capillary inlet and operated at potentials ($V_1$) of +5.3 and +8.1 kV, from a standard ESI power supply (Analytica, Branford, Mass., USA). Samples were applied to a 4 mm diameter stainless steel target. The target was approximately centered between the heated capillary inlet and the corona needle and was slightly offset (ca. 2 mm) from center. To improve ion transport at atmospheric pressure, an offset potential ($V_2$) of +2 kV was applied to the target by a power supply (Model 205A, Bertan Associates Inc., Hicksville, N.Y., USA). Desorption of neutral molecules was accomplished by irradiation of the target with a 10.6-$\mu$m pulsed $CO_2$ laser ($\mu$-TEA, Laser Science Inc., Franklin, Mass., USA). A 10 cm focal length zinc selenide lens (Laser Research Optics, Providence, R.I., USA) focused the beam to a spot size of either 1.35 mm (~$5\times10^6$ W/$cm^2$) or 0.20 mm (~$2\times10^8$ W/$cm^2$). Laser triggering was synchronized to coincide with the prescan period of the scan function, which was 3 ms before the ion injection period of each microscan.

A Finnigan GCQ quadrupole ion trap mass spectrometer (ThermoFinnigan, Austin, Tex., USA) was adapted to accept a two-stage differentially-pumped vacuum manifold (McHale, K. J., Yost, R. A. (2000) *Proc. 48$^{th}$ ASMS Conf. Mass Spectrometry and Allied Topics,* Long Beach, Calif.). An Analytica ESI source manifold (Branford, Mass., USA), modified and fitted with a metal heated capillary inlet, was mounted before the first differentially pumped region of the vacuum manifold. To prevent solvation of the ions, the heated capillary was maintained at ~185° C. The intermediate pressure region between the heated capillary and the skimmer was backed by two 360 L/min Pfeiffer-Balzers mechanical pumps (Nashua, N.H., USA). Ions sampled through the skimmer cone were transported by an octopole through the second differentially pumped region of the vacuum manifold to the quadrupole ion trap during the ion injection step of the scan function. Mass analysis was effected by resonantly ejecting the ions from the quadrupole ion trap to an off-axis conversion dynode held at −15 kV (for positive ion analysis), whereby the secondary ions were detected by an electron multiplier set at −1600 V.

Standard solutions of spiperone and reserpine (Sigma, St. Louis, Mo., USA) were prepared at various concentrations in a solution of 50% aqueous methanol with 0.10% formic acid. For the AP-LD/CI analysis, an aliquot of standard solution was deposited onto the stainless steel probe, dried, and topped with 4 $\mu$L of glycerol (Fisher Scientific, Fair Lawn, N.J., USA). After this sample solution was mixed in situ with a small glass rod, the target was placed on the AP-LD/CI device. The sample did not require x-y manipulation during analysis, as the glycerol matrix allowed continual analyte refreshment on the target surface.

With no sample applied to the target and only the corona discharge on, the most abundant ions were m/z 55 and 73, corresponding to $[H_3O(H_2O)_2]^+$ and $[H_3O(H_2O)_3]^+$, respectively, which is consistent with reagent ions observed under ambient air APCI conditions (Sunner, J., Nicol, G., Kebarle, P. (1988) *Anal. Chem.* 60:1300; Sunner, J., Ikonomou, M. G., Kebarle, P. (1988) *Anal. Chem.* 60:1308). Next, a series of experiments utilizing glycerol as a target substrate were performed to evaluate the AP-LD/CI source. When neat glycerol was applied to the target, again only the corona discharge on, the resulting spectrum was unchanged from that taken without glycerol on the target. Subjecting the glycerol to laser desorption (with the corona discharge on), the $[M+H]^+$ of glycerol was observed, in addition to the $[2M+H-H_2O]^+$, and $[2M+H]^+$ cluster ions of glycerol. When the corona discharge was turned off, these ions were not observed.

Figure 4A:
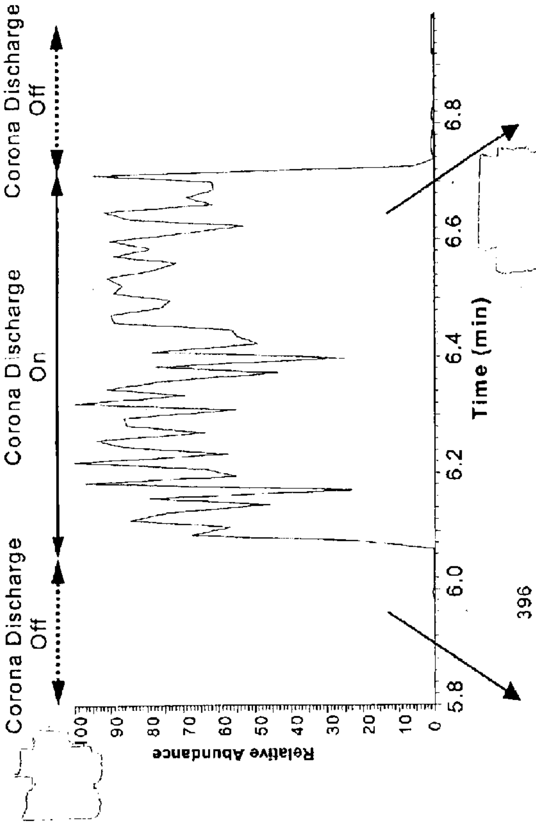
FIG. 4A shows an ion chromatogram for the $[M+H]^+$ of spiperone (m/z 396) from an analytical evaluation of an AP-LD/CI source in accordance with the subject invention.
Figure 4B:
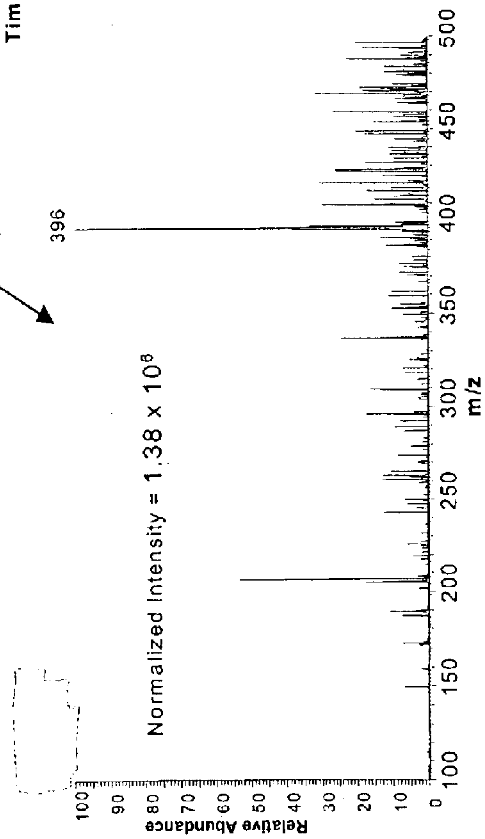
FIG. 4B shows a mass spectrum obtained without a corona discharge used in conjunction with an embodiment of the subject invention.
Figure 4C:
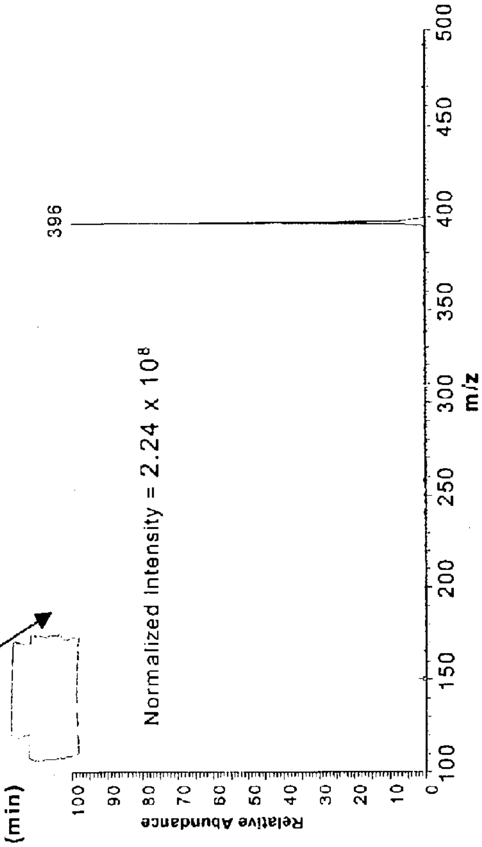
FIG. 4C shows a mass spectrum obtained with a corona discharge used in conjunction with an embodiment of the subject invention.

For analytical evaluation of the AP-LD/CI source, the antipsychotic drug spiperone was chosen as a target compound (Escandon, N.A., Zimmerman, D. C., McCall, R. B. (1994) *J. Pharmacol. Exp. Ther.* 268: 441). The sample consisted of 3 $\mu$g of spiperone delivered to the target tip, allowed to dry, and followed by 4 $\mu$L of glycerol. The laser irradiance was initially adjusted to ~$2\times10^8$ W/$cm^2$ by manipulation of the focusing lens. As indicated in FIG. 4A, by turning the discharge on and off while maintaining laser desorption, the resulting ion chromatogram for the $[M+H]^+$ of spiperone (m/z 396) during constant scanning with the corona discharge toggled off and on shows the effect of the corona discharge. FIGS. 4B and 4C portray mass spectra obtained without and with the corona discharge, respectively. Each spectrum represents a single analytical scan, the average of 2 microscans, each consisting of 1 laser pulse followed by mass analysis. With the discharge off (FIG. 4B), a weak signal for the m/z 396 was observed. With the corona discharge on (FIG. 4C), the m/z 396 signal increased approximately 150 fold, showing that the corona discharge has a significant effect on the production of the spiperone molecular ion.

For the subject AP/LD-CI technique described in this example, the intended role of the laser is that of gas-phase analyte molecule production. Thus, the laser irradiance was lowered to ~$5\times10^6$ W/cm$^2$, with the aim of desorbing analyte molecules without concomitant ion formation. At this reduced power, no spiperone ions at m/z 396 were observed without simultaneous use of the corona discharge. With the discharge on, a strong spiperone signal resulted. However, since no glycerol related ions were seen, the corona voltage was raised to +8.1 kV to increase the discharge current and enhance the reagent ion population from the ambient water vapor. The resulting increase in analyte signal required the ion trapping time to be lowered from 100 ms to 7 ms. In general, extending the duration of the ion trapping period can increase sensitivity. However, because of the substantial number of ions being generated via AP-LD/CI (under the higher corona needle voltage, +8.1 kV), ion trapping times longer than 7 ms induced space charge effects, causing mass shifts.

Figure 5:
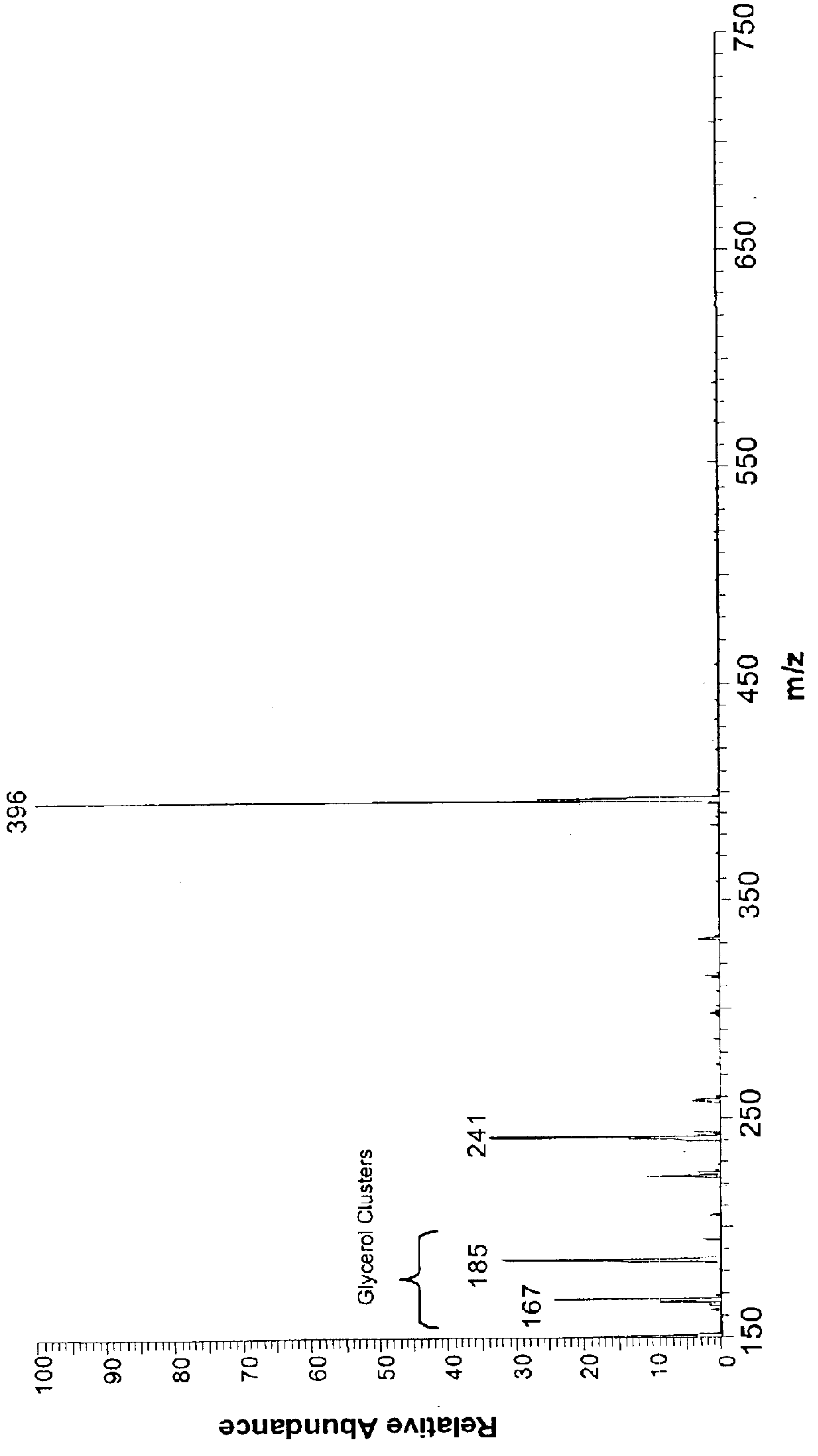
FIG. 5 shows an AP-LD/CI mass spectrum from an analytical evaluation in accordance with the subject invention.

With the increased sensitivity, subsequent experiments were conducted with a 150-fold reduction of spiperone to 20 ng, still contained in 4 $\mu$L of glycerol. The AP-LD/CI mass spectrum of 20 ng spiperone, $[M+H]^+$ at m/z 396, in 4 $\mu$L of glycerol, shown in FIG. 5 shows the resulting ion signal, again the average of two single shot spectra (normalized intensity =$5.15\times10^7$). The $[M+H]^+$ for spiperone is observed as the base peak, while glycerol related ions $[2M+H-H_2O]^+$, and $[2M+H]^+$ at m/z 167 and 185 were also produced. We have tentatively identified the 241 m/z as the $[M+H_2O+H]^+$ ion of the contaminant diethyl phthalate.

Figure 6:
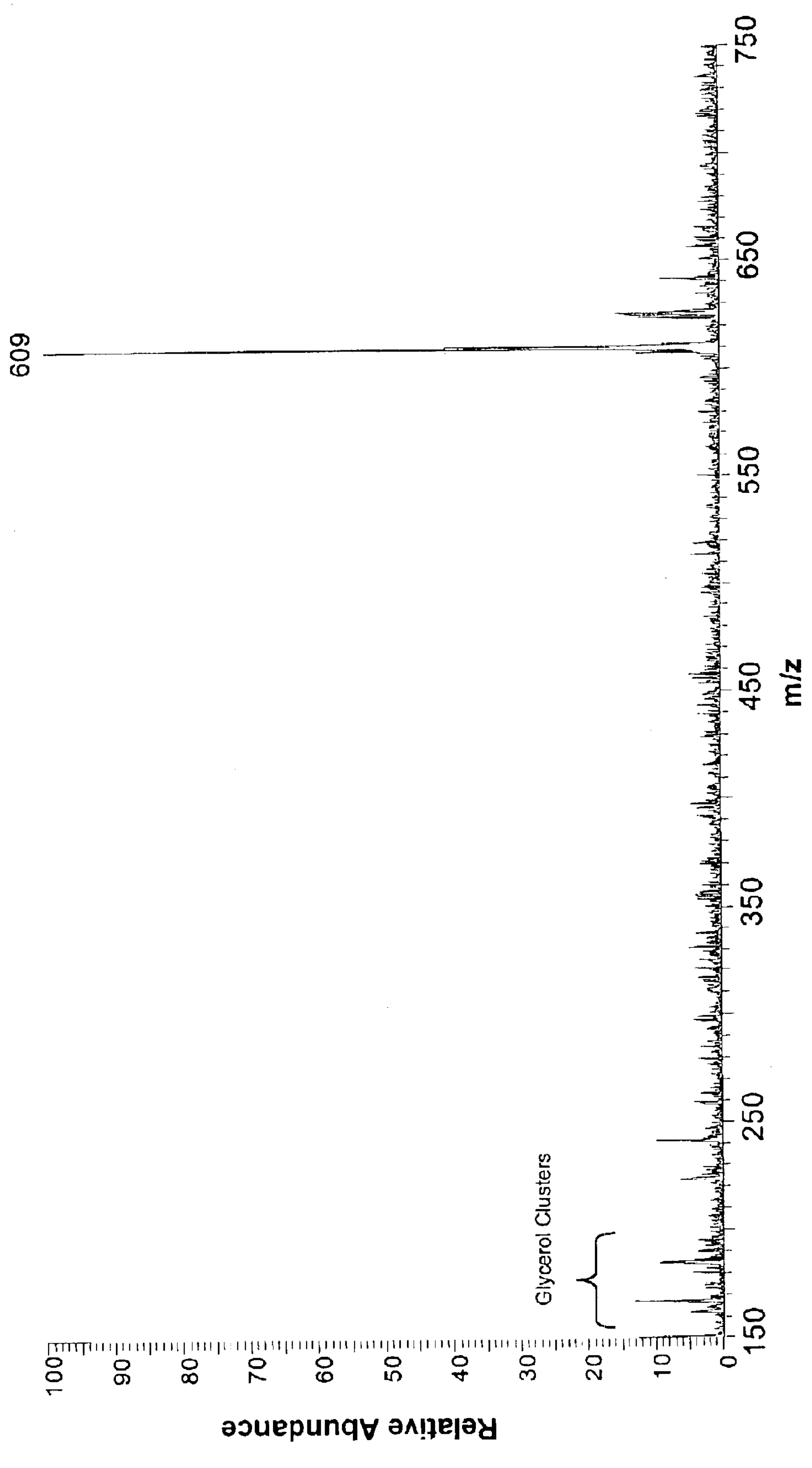
FIG. 6 shows a mass spectrum of reserpine using an AP-LD/CI source in accordance with the subject invention.

To evaluate the subject technique with another sample type, 20 ng samples of reserpine were next analyzed. FIG. 6 displays a mass spectrum of 20 ng reserpine, $[M+H]^+$ at m/z 609, in 4 $\mu$l of glycerol, using the same AP-LD/CI conditions that were employed FIG. 5. As in the case of spiperone, the $[M+H]^+$ of reserpine was produced as the base peak. An oxidation product of reserpine was observed at 16 u higher than the $[M+H]^+$, and was verified by MS/MS.

Despite the 150-fold reduction in spiperone mass used to generate the signal in FIG. 6, the ion signal only dropped to 1/4 of that shown in FIG. 2. More spiperone was present under FIG. 4 conditions, and more neutral spiperone molecules were presumably desorbed, but the lower corona discharge voltage resulted in a reduced ionization efficiency.

Under the $5\times10^6$ W/cm$^2$ laser irradiance and +8.1 kV corona needle voltage conditions, the sample produced a stable analyte signal for approximately 20 minutes with continuous laser desorption, at which time the glycerol/analyte mixture was consumed. When the irradiance was reduced 5 fold to $10^6$ W/cm$^2$, the analyte signal intensity remained at the previous level (data not shown). Moreover, the sample yielded this ion signal for a period of 45 minutes with no noticeable depletion of the glycerol/analyte mixture. Since the $10^6$ W/cm$^2$ irradiance produced a similar analyte signal with less material desorbed per shot, it is likely that the main factor currently limiting ionization efficiency is the magnitude of the reagent ion population.

In addition to the corona needle voltage, potentials supplied to the target and the heated ($V_3$) capillary strongly influenced analyte signal. For example, the heated capillary offset was set to +40 V for the spectrum collected for spiperone in FIG. 5, which shows a strong $[M+H]^+$ signal. However, when reserpine was sampled under these conditions, very little $[M+H]^+$ was observed. Raising the heated capillary offset to +120 V resulted in the spectrum in FIG. 6, showing an intense $[M+H]^+$ peak. This may be evidence that reserpine tends to form clusters under the present AP-LD/CI conditions. Declustering may be enhanced by increasing the heated capillary offset potential, which in turn accelerates the ions in the region between the heated capillary and the skimmer cone (Bruins A. P. (1991) *Mass Spec. Rev.* 10: 53), a conclusion also supported by the reduction of glycerol related clusters, comparing FIGS. 5 and 6.

EXAMPLE 2

Analysis of Peptides

This example relates to the use of an LD-APCI source which utilizes a laser pulse to desorb intact neutral molecules, followed by chemical ionization via reagent ions produced by a corona discharge. This source employs a heated capillary atmospheric pressure (AP) inlet coupled to a quadrupole ion trap mass spectrometer and allows sampling under normal ambient air conditions. With this arrangement, desorption is decoupled from the ionization allowing for the individual optimization of each step with increased efficiency and selectivity. In MALDI, matrices must not only assist with the transport of the analyte into the gas-phase, but must also provide a means for ionization. However, in LD-APCI the matrix containing the analyte need not assist with the ionization, thereby opening the door to countless new possible analyte containing matrices, including polyacrylamide gels. Using the LD-APCI source, we present here the first mass spectrometric analysis of tryptic peptides directly from intact polyacrylamide gels at AP.

Figure 7A:
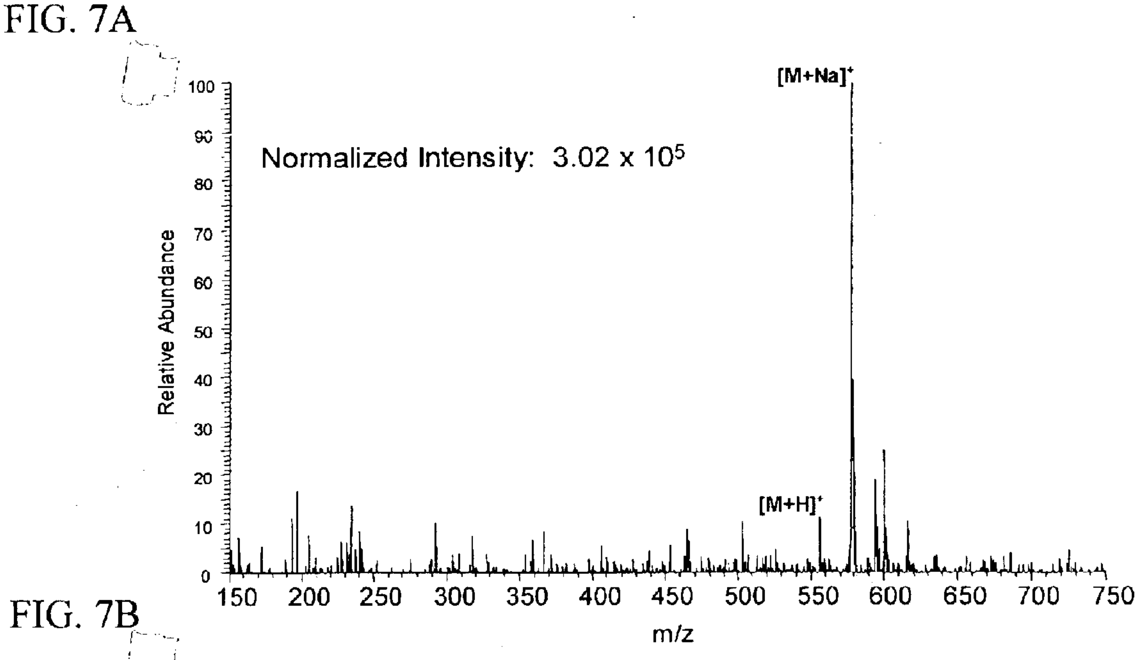
FIG. 7A shows a mass spectrum obtained with a corona discharge used in conjunction with an embodiment of the subject invention.
Figure 7B:
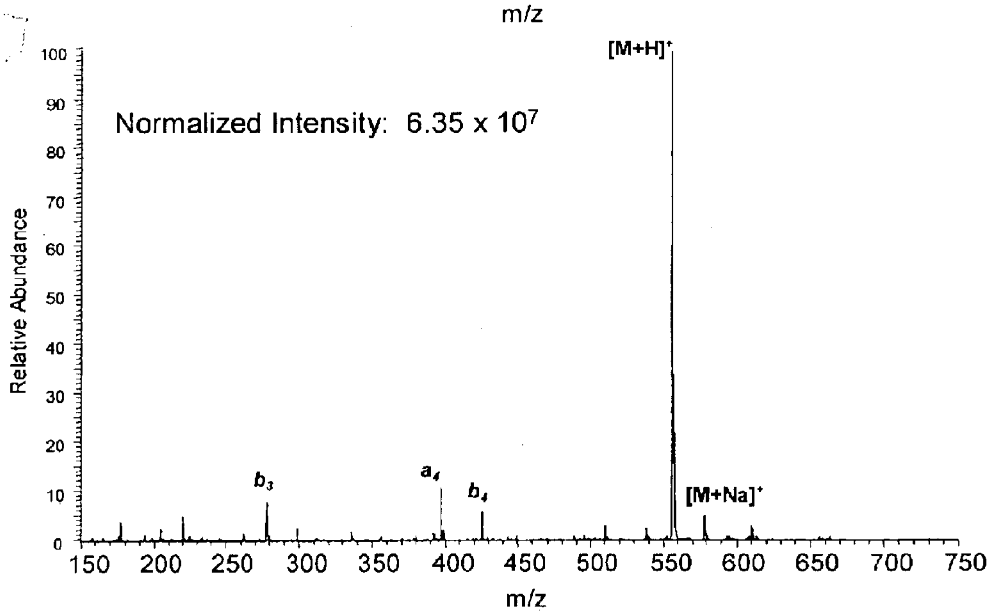
FIG. 7B shows a mass spectrum obtained without a corona discharge used in conjunction with an embodiment of the subject invention.

LD-AP/CI source of this example can be used to analyze tryptic peptides directly from intact polyacrylamide gels at atmospheric pressure. To determine the ability of the LD-AP/CI source to desorb/ionize peptides, the peptide leu-enkephalin was dissolved in a 50% aqueous glycerol solution. A small amount (~0.2 $\mu$m) of that solution was applied directly to the target, representing the deposition of 100 pmol. FIGS. 7A and 7B exhibit mass spectra that were obtained without and with the corona discharge, respectively. FIG. 7A represents the average of 100 single-shot spectra (required to generate a quality spectrum), while FIG. 7B represents the average of only 5 single-shot mass spectra. Important differences can be observed when comparing FIGS. 7A and 7B. Perhaps most distinguishing is the pronounced $[M+Na]^+$ peak observed with corona discharge off, whilst the $[M+H]^+$ dominates the LD-APCI spectrum (corona discharge on) with an enhancement ~1400. With the corona discharge off, cationization is the dominating ionization process. In contrast, the initiation of the corona discharge establishes (LD-APCI) an alternative means of ionization, that of gas-phase proton transfer.

Numerous other peptides including neurotensin 8-13, neurotensin 1-11, des-Pro bradykinin, bradykinin, arg-vasopressin, and angiotensin I were also studied in the same manner as leu-enkephalin, outlined above. In all cases, enhancements similar to that described in FIG. 7 were observed.

Figure 8A:
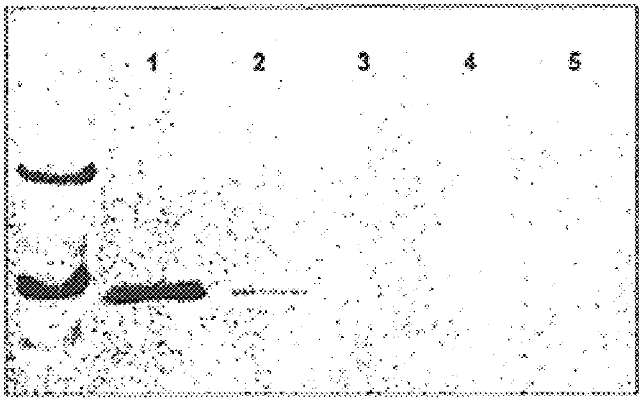
FIG. 8A shows lanes 1–5 of polyacrylamide gels loaded with 1000, 500, 100, 50, and 10 pmol of the protein horse cytochrome c (Sigma), respectively.

As the data above indicates, the LD-APCI approach can allow for the direct analysis of numerous analyte containing matrices due to the decoupling of desorption from the ionization. One such application is the detection of tryptic peptides directly from a polyacrylamide gel following an in-gel protein digest. To accomplish this, polyacrylamide gels were purchased from BioRad (15% Tris-HCl Ready Gels) and loaded with 1000, 500, 100, 50, 10 pmol of the protein horse cytochrome c (Sigma) for lanes 1–5, as labeled in FIG. 8(A). Following electrophoresis the gel was stained with coomassie brilliant blue the stained spots were excised, and then washed twice with 200 mM $NH_4HCO_3$, pH 8 washing buffer. Next, the gel slices were brought to dryness in a speedvac for 30 minutes. Using the difference in gel mass (before and after drying), the gel slice was rehydrated in a trypsin containing 50 mM $NH_4HCO_3$ solution (usually 3–6 microliters depending on gel slice size). An effort was made to eliminate adding additional liquid to prevent migration of tryptic peptides out of the gel. Once rehydrated the gel slices were incubated at 37° C. for 20 hours, after which the slices were placed on the LD-APCI-MS target and directly analyzed.

Figure 8B:
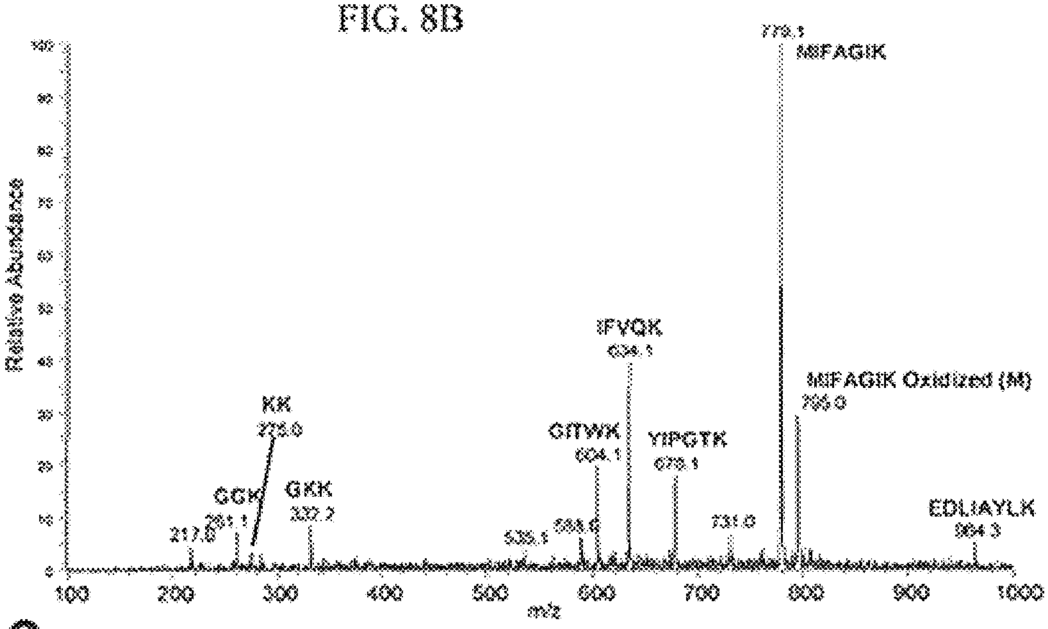
FIG. 8B shows a mass spectrum obtained from polyacrylamide gel loaded with 1000 pmol of the protein horse cytochrome c (Sigma).
Figure 8C:
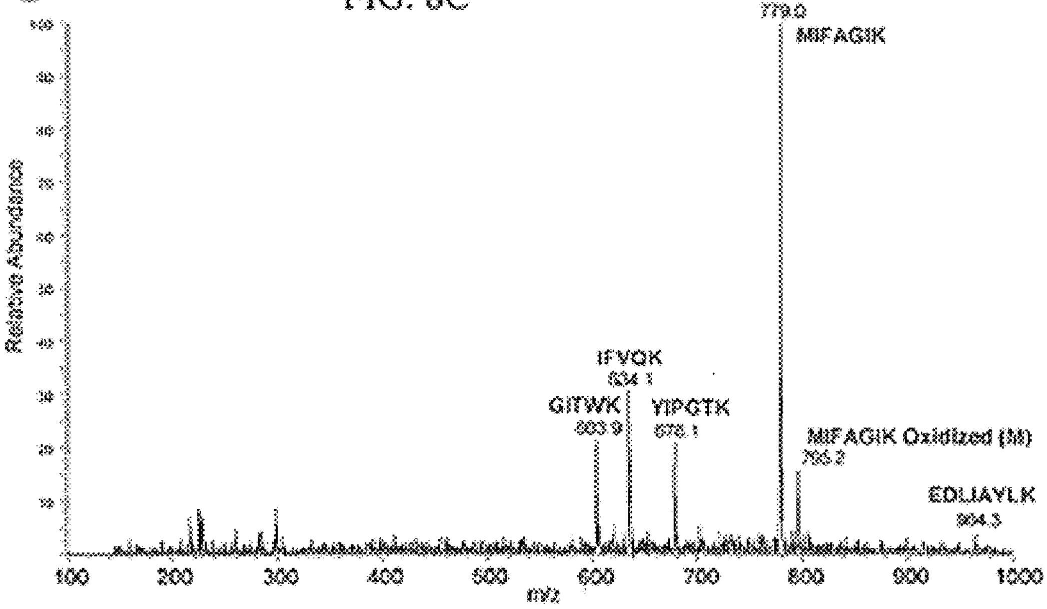
FIG. 8C shows a mass spectrum obtained from polyacrylamide gel loaded with 500 pmol of the protein horse cytochrome c (Sigma).

FIGS. 8(B–C) presents the LD-APCI-MS data that was obtained from spots 1 and 2, respectively. Here nearly every peak produced can be attributed to a different tryptic peptide originating from equine cytochrome c. Additionally, unlike the results obtained from aqueous glycerol solutions outlined above, desorption directly from polyacrylamide gels produced no detectable ions with corona discharge off (data not shown). For irradiance at 10.6 $\mu$m, the polyacrylamide gel matrix produces no ions with corona discharge off; however, by decoupling desorption from ionization, with the corona discharge on, this is not required. Another interesting aspect that can be observed in FIGS. 8(B–C) is that nearly every m/z detected results from a tryptic peptide of cytochrome c, with relatively few background ions observed. This likely results because of the gas-phase neutral molecule population that is produced after a desorption event, only those with the highest proton affinities will be ionized by the corona discharge, peptides in this case.

It is important to note that the data presented in FIG. 8 represents coupling of LD-APCI-MS to PAGE. Consequently, an evaluation of the preparation and analysis steps can likely improve sensitivity and time efficiency. The subject method can eliminate the necessity of extraction, cleanup, and sample preparation.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method of ionizing a sample material, comprising:

positioning a sample material, desorbing neutral molecules from the sample material, generating reagent ions such that the reagent ions ionize the desorbed neutral molecules so as to produce gas-phase ions of the sample material.

2. The method according to claim 1, wherein desorbing neutral molecules from the sample material comprises incidenting laser radiation onto the sample material so as to desorb neutral molecules from the sample material.

3. The method according to claim 2, wherein generating reagent ions comprises generating reagent ions with a discharge.

4. The method according to claim 3, wherein generating reagent ions with a discharge comprises generating reagent ions with a corona discharge.

5. The method according to claim 3, wherein generating reagent ions with a discharge comprises generating reagent ions with a glow discharge.

6. The method according to claim 2, wherein generating reagent ions comprises generating reagent ions with a Beta-emitter.

7. The method according to claim 1, wherein desorbing neutral molecules from the sample material occurs at atmospheric pressure.

8. The method according to claim 1, wherein desorbing neutral molecules from the sample material occurs at vacuum.

9. The method according to claim 1, wherein desorbing neutral molecules from the sample material occurs above atmospheric pressure.

10. The method according to claim 1, wherein desorbing neutral molecules from the sample material occurs below atmospheric pressure.

11. The method according to claim 2, wherein incidenting laser radiation onto the sample material comprises incidenting laser radiation with a wavelength between about 0.8 $\mu$m and about 25 $\mu$m.

12. The method according to claim 2, wherein incidenting laser radiation onto the sample material comprises incidenting laser radiation with a wavelength near 3 $\mu$m.

13. The method according to claim 2, wherein incidenting laser radiation onto the sample material comprises incidenting laser radiation with a wavelength which correlates with N—H and O—H stretching modes.

14. The method according to claim 2, wherein inidenting laser radiation onto the sample material comprises incidenting laser radiation with a wavelength between about 5.5 $\mu$m and about 6.5 $\mu$m.

15. The method according to claim 2, wherein incidenting laser radiation onto the sample material comprises incidenting laser radiation with a wavelength which correlates with C═O and C—N stretching modes.

16. The method according to claim 2, wherein incidenting laser radiation onto the sample material comprises incidenting laser radiation with a wavelength near 10 $\mu$m.

17. The method according to claim 2, wherein incidenting laser radiation onto the sample material comprises incidenting laser radiation with a wavelength which correlates with O—H and C—H stretching modes.

18. The method according to claim 2, wherein incidenting laser radiation onto the sample material comprises incidenting laser radiation with a wavelength between about 100 nm and about 1000 nm.

19. The method according to claim 2, wherein the sample is a liquid.

20. The method according to claim 2, wherein the sample is a solid.

21. The method according to claim 2, wherein positioning the sample material comprises affixing the sample material to a target.

22. The method according to claim 21, wherein affixing the sample material to a target comprises positioning a support structure holding the sample material to the target, and wherein the support structure is passive during the desorption of neutral molecules from the sample.

23. The method according to claim 22, wherein the support structure is polyacrylamide gel.

24. The method according to claim 22, wherein the support structure is a thin-layer chromatography plate.

25. The method according to claim 1, wherein the support structure is selected from the group consisting of:

a biological tissue, an agarose gel, paper, a fabric, a polymer, plastic, geological material, soil, biological solution, blood plasma, whole blood, urine, water, glycerol, m-Nitrobenzyl alcohol (NBA), and extracellular fluid.

26. The method according to claim 1, further comprising:

inputting the generated gas-phase ions of the sample material into an atmospheric pressure inlet of a mass spectrometer.

27. The method according to claim 26, further comprising:

assisting transport of the generated gas-phase ions into the atmospheric pressure inlet of the mass spectrometer.

28. The method according to claim 1, wherein:

positioning a sample material, desorbing neutral molecules from the sample material, and generating reagent ions occur within an enclosed region.

29. The method according to claim 28, further comprising:

purging the enclosed region with one or more specialty gases.

30. The method according to claim 29, wherein the enclosed region is purged with one or more gases selected from the group consisting of: N, Ar, He, $CH_4$, CO, $CO_2$, and $H_2O$.

31. The method according to claim 2, wherein incidenting laser radiation onto the sample material comprises incidenting pulsed laser radiation.

32. The method according to claim 4, wherein incidenting laser radiation onto the sample material comprises incidenting pulsed laser radiation onto the sample material, wherein generating reagent ions with a corona discharge comprises generating reagent ions with a pulsed corona discharge, and wherein the duty cycle of the pulsed corona discharge is adjusted to and delayed with respect to the duty cycle of the pulsed incident laser radiation.

33. The method according to claim 1, further comprising:

detecting the gas-phase ions of the sample material.

34. The method according to claim 33, which comprises detecting the gas-phase ions of the sample as a function of time.

35. The method according to claim 2, wherein positioning a sample material comprises affixing the sample material to a target, further comprising:

creating relative movement between the target and the incident laser radiation as a function of time, detecting the gas-phase ions as a function of time, and correlating the relative movement between the target and the incident laser radiation and the detection of the gas-phase ions as a function of time to provide information regarding the location of the sample material.

36. The method according to claim 35, wherein creating relative movement between the target and the incident laser radiation comprises moving the target.

37. The method according to claim 35, wherein creating relative movement between the target and the incident laser comprises moving the incident laser radiation.

38. The method according to claim 33, wherein detecting the gas-phase ions of the sample material comprises introducing at least a portion of the gas-phase ions into a means for detecting the gas-phase ions.

39. The method according to claim 38, wherein introducing at least a portion of the gas-phase ions into a means for detecting the gas-phase ions comprises introducing the at least a portion of the gas-phase ions into a mass spectrometer.

40. The method according to claim 39, wherein introducing at least a portion of the gas-phase ions into a mass spectrometer is accomplished in a pulsed manner.

41. The method according to claim 40, wherein the pulse cycle of incidenting pulsed laser radiation onto the sample and the pulse cycle of introducing at least a portion of the gas-phase ions into a mass spectrometer in a pulsed manner are correlated.

42. The method according to claim 35, further comprising:

applying an offset potential to the target, wherein the application of the offset potential to the target improves ion transport.

43. The method according to claim 1, wherein the sample material is selected from the group consisting of: a pharmaceutical compound, spiperone, reserpine, peptides, proteins, oligonucleotides, and environmental toxicants.

44. The method according to claim 4, wherein generating reagent ions with a corona discharge comprises generating reagent ions with a corona discharge in a positive mode.

45. The method according to claim 4, wherein generating reagent ions with a corona discharge comprises generating reagent ions with a corona discharge in a negative mode.

46. An apparatus for ionizing a sample material, wherein said apparatus comprises:

a means for desorbing neutral molecules from a sample material; and a means for generating reagent ions, wherein the generated reagent ions ionize the desorbed neutral molecules so as to produce gas-phase ions of the sample material.

47. The apparatus according to claim 46, wherein the means for desorbing neutral molecules from a sample comprises a means for incidenting laser radiation onto the sample material.

48. The apparatus according to claim 46, wherein the means for generating reagent ions comprises a discharge.

49. The apparatus according to claim 48, wherein the discharge is a corona discharge.

50. The apparatus according to claim 48, wherein the discharge is a glow discharge.

51. The apparatus according to claim 46, wherein the means for generating reagent ions comprises a Beta-emitter.

52. The apparatus according to claim 47, wherein the means for incidenting laser radiation onto the sample comprises a means for incidenting laser radiation with a wavelength between about 0.8 μm and about 25 μm.

53. The apparatus according to claim 47, wherein the means for incidenting laser radiation onto the sample comprises a means for incidenting laser radiation with a wavelength near 3 μm.

54. The apparatus according to claim 47, wherein the means for incidenting laser radiation onto the sample material comprises a means for incidenting laser radiation with a wavelength which correlates with N—H and O—H stretching modes.

55. The apparatus according to claim 47, wherein the means for incidenting laser radiation onto the sample material comprises a means for incidenting laser radiation with a wavelength between about 5.5 μm and about 6.5 μm.

56. The apparatus according to claim 47, wherein the means for incidenting laser radiation onto the sample material comprises a means for incidenting laser radiation with a wavelength which correlates with C═O and C—N stretching modes.

57. The apparatus according to claim 47, wherein the means for incidenting laser radiation onto the sample material comprises a means for incidenting laser radiation with a wavelength near 10 μm.

58. The apparatus according to claim 47, wherein the means for incidenting laser radiation onto the sample material comprises a means for incidenting laser radiation with a wavelength which correlates with O—H and C—H stretching modes.

59. The apparatus according to claim 47, wherein the means for incidenting laser radiation onto the sample comprises a means for incidenting laser radiation with a wavelength between about 100 nm and about 1000 nm.

60. The apparatus according to claim 45, further comprising:

a target, wherein the sample material is affixed to the target.

61. The apparatus according to claim 46, further comprising:

a means for applying an offset potential to the target, wherein application of the offset potential to the target improves ion transport.

62. The apparatus according to claim 47, further comprising:

a support structure for positioning the sample material with respect to the target, wherein the means for desorbing neutral molecules from a sample material comprises a means for incidenting laser radiation onto the sample material so as to desorb neutral molecules from the sample material, wherein the support structure is passive during the desorption of neutral molecules from the sample material.

63. The apparatus according to claim 62, wherein the support structure is polyacrylamide gel.

64. The apparatus according to claim 62, wherein the support structure is a thin-layer chromatography plate.

65. The apparatus according to claim 46, wherein the support structure is selected from the group consisting of:

agarose gels, paper, fabrics, polymers, geological materials, biological materials, water, glycerol, and m-Nitrobenzyl alcohol (NBA), and extracellular fluid.

66. The apparatus according to claim 46, further comprising:

a means for coupling to an atmospheric pressure inlet of a mass spectrometer.

67. The apparatus according to claim 66, further comprising:

a means for assisting transport of generated gas-phase ions into the atmospheric pressure inlet of the mass spectrometer.

68. The apparatus according to claim 46, further comprising:

an enclosed region, wherein the neutral molecules are desorbed within the enclosed region, and wherein the generated reagent ions ionize the neutral molecules within the enclosed region.

69. The apparatus according to claim 46, further comprising:

a means for purging the enclosed region with one or more specialty gases.

70. The apparatus according to claim 69, wherein the one or more specialty gases are selected from the group consisting of: N, Ar, He, $CH_4$, CO, $CO_2$, $H_2O$, and mixtures thereof.

71. The apparatus according to claim 47, further comprising:

a means for pulsing the incident laser radiation onto the sample material.

72. The apparatus according to claim 49, further comprising:

a means for pulsing the incident laser radiation onto the sample material; and a means for pulsing the corona discharge, wherein the duty cycle of the pulsed corona discharge is adjusted to and delayed with respect to the duty cycle of the pulsed incident laser radiation.

73. The apparatus according to claim 46, further comprising:

a means for detecting the gas-phase ions of the sample material.

74. The apparatus according to claim 73, wherein the means for detecting the gas-phase ions of the sample material comprises a means for detecting the gas-phase ions of the sample material as a function of time.

75. The apparatus according to claim 46, wherein the apparatus is an ionization source.

* * * * *

UNITED STATES PATENT AND TRADEMARK OFFICE

CERTIFICATE OF CORRECTION

PATENT NO. : 6,838,663 B2
APPLICATION NO. : 10/448182
DATED : January 4, 2005
INVENTOR(S) : Joshua J. Coon and Willard W. Harrison It is certified that error appears in the above-identified patent and that said Letters Patent is hereby corrected as shown below:

Column 1,
Lines 9-11, “The subject invention was made with government support under a research project supported by NIH Grant No. ES07375.” should read -- The subject invention was made with government support under a research project supported by NIH Grant No. ES07375. The government has certain rights to this invention. --.

Signed and Sealed this

Tenth Day of November, 2009

David J. Kappos
*Director of the United States Patent and Trademark Office*